United States Patent [19]

Banda

[11] 4,231,639

[45] Nov. 4, 1980

[54] POLY-LAYER LIQUID CRYSTAL DISPLAY DEVICE

[75] Inventor: Syunji Banda, Suwa, Japan

[73] Assignee: Kabushiki Kaisha Suwa Seikosha, Tokyo, Japan

[21] Appl. No.: 852,874

[22] Filed: Nov. 18, 1977

[30] Foreign Application Priority Data

Nov. 19, 1976 [JP] Japan .................. 51-139861

[51] Int. Cl.³ ............................................ G02F 1/133
[52] U.S. Cl. ...................... 350/335; 350/334
[58] Field of Search ....................... 350/334, 335

[56] References Cited

U.S. PATENT DOCUMENTS

| | | |
|---|---|---|
| 3,941,454 | 3/1976 | Maezawa .................. 350/334 |
| 3,944,331 | 3/1976 | Janning .................. 350/335 X |
| 3,995,949 | 12/1976 | Maezawa .................. 350/334 |

*Primary Examiner*—Edward S. Bauer
*Attorney, Agent, or Firm*—Blum, Kaplan, Friedman, Silberman and Beran

[57] ABSTRACT

A poly-layer nematic liquid crystal display device is constructed for operation in the twisted nematic mode, the surfaces of the plates are oriented for rotating the plane of polarization of polarized light in alternate directions as the light passes through each successive layer of the device. Such alternation in direction of rotation provides for maximum contrast and visibility of the display produced by the device.

4 Claims, 5 Drawing Figures

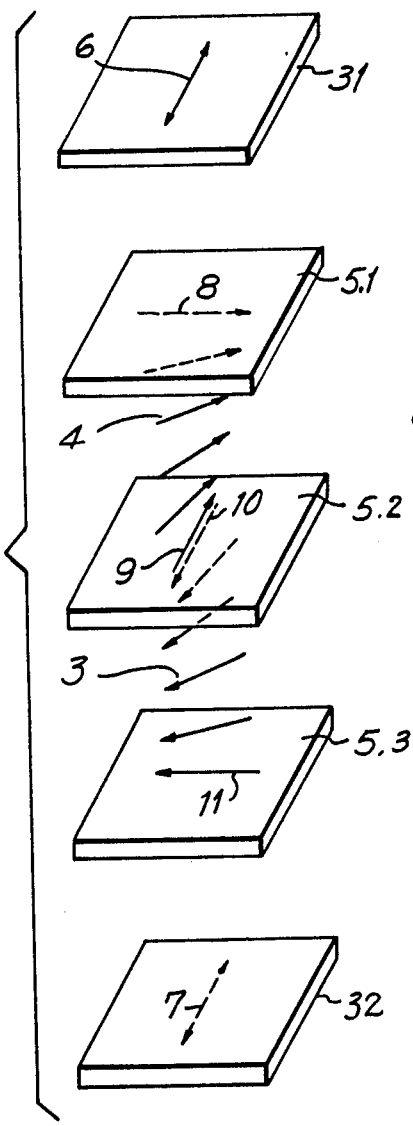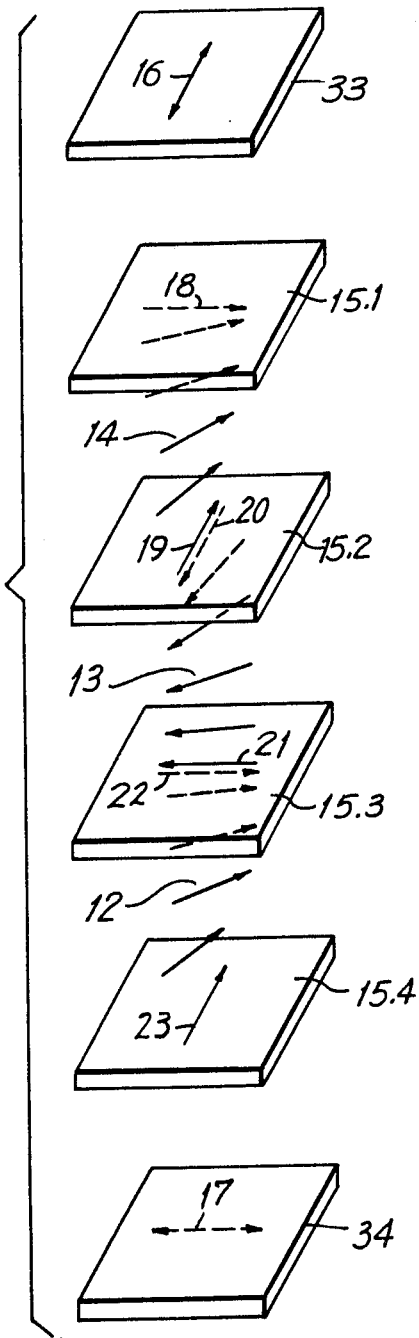

POLY-LAYER LIQUID CRYSTAL DISPLAY DEVICE

BACKGROUND OF THE INVENTION

As is well known, liquid crystal molecules are essentially linear in structure so that such molecules can be said to have a major axis. Also, the molecules, in general, are asymmetric so that it is relevant to speak of the molecules as having a preferred or specific orientation. Thus, a pair of molecules may not only be parallel or transverse to each other but may also be anti-parallel to each other. For example, rotation of an asymmetric linear molecule through an angle of 180° places the molecule in a position in which it is anti-parallel to its original position.

Where a liquid crystal display device is to operate in the twisted nematic mode, the relationship between the plane of polarization of polarized light falling on the molecules and the direction of the major axis of the molecules becomes pertinent. Specifically, transmission of light through the device is greater for light vibrating perpendicularly to the major axis direction of the liquid crystal molecules than for light vibrating in parallel with said major axis. Even when only a single liquid crystal layer is interposed between polarizer and analyzer plates, significant variations in contrast and visibility as the result of variation in the angle between the plane of polarization of incident light and orientation of the liquid crystal molecules in the nearer portion of the liquid crystal layer have been found. Where the number of liquid crystal layers is greater than one, namely when a poly-layer device is used, the loss of contrast and visibility as the result of random choice of the angle between plane polarized light entering each layer and the orientation of the molecules at the nearer surface of the layer can be severe. Accordingly, a construction in which orientation directions are such as to maximize visibility and contrast present substantial advantages. The construction of a single-layer liquid crystal cell which operates in the twisted nematic mode and which has a preferred viewing direction is described in U.S. Pat. No. 3,941,454, said patent being incorporated herein by reference as though presented in full.

SUMMARY OF THE INVENTION

A poly-layer liquid crystal display device constructed for operating in the twisted nematic mode includes an array of at least three plates with nematic liquid crystals between each adjacent pair of plates in the array. Polarization devices are positioned at each end of the array. Each plate in each pair of adjacent plates presents a face to a liquid crystal layer, said faces being structured to unidirectionally orient the immediately-adjacent molecules in the liquid crystal layer therebetween. The directions of orientation are at approximately 90° to each other so that plane-polarized light passing therethrough is rotated through approximately 90°. The directions of rotation alternate in successive layers. Also, visibility and contrast are improved by positioning said polarization devices so that the polarization axes thereof, in each case, are at approximately 90° to the orientation direction produced by the inner surface of the corresponding, adjacent end plate.

Accordingly, an object of the present invention is a poly-layer liquid crystal display device of the twisted nematic mode having improved contrast and visibility.

Another object of the present invention is a poly-layer liquid crystal display device for operation in the twisted nematic mode wherein each layer of liquid crystals is structured for rotating plane-polarized light through an angle of approximately 90°, the direction of rotation reversing in each successive layer.

A further object of the present invention is a poly-layer liquid crystal display device constructed for operating in the twisted nematic mode wherein the surfaces of the plates in the poly-layer array forming the device are structured for orienting linear liquid crystal molecules therebetween so that molecules adjacent the plates are oriented at approximately 90° to the plane of polarization of light entering the layer of liquid crystals.

Still a further object of the present invention is a timepiece including a poly-layer liquid crystal display cell in accordance with the present invention.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 2 shows the preferred orientations and rotational directions of the liquid crystal molecules in a device having two layers, in accordance with the present invention.

FIG. 3 shows the preferred orientations and directions of rotation for a three-layer device in accordance with the present invention.

DESCRIPTION OF THE PREFERRED EMBODIMENTS

Generally speaking, the present invention provides high visibility and high contrast in a poly-layer liquid crystal display device constructed for operation in the twisted nematic mode. Operation in the twisted nematic mode requires that the inner surfaces of the transparent plates making contact with the liquid crystal layer therebetween be unidirectionally oriented. Such unidirectional orientation is generally effected by rubbing the surface of the plate in a single direction. It is emphasized that such single-direction rubbing is truly unidirectional, that is, rubbing in a back-and-forth manner is excluded. It is also noted that, with respect to super-imposed plates, parallel directions of orientation are those making an angle of approximately 0° with each other. When the orientation directions, that is, the directions of rubbing, make an angle of approximately 180° with each other, these are termed "anti-parallel".

The significance of unidirectional rubbing stems from the fact that liquid crystal molecules of the type used in twisted nematic mode devices are asymmetric. Consequently, it can be stated with certainty whether the helical array of liquid crystal molecules in a display cell is in a clockwise or counterclockwise configuration.

Figure 1A:
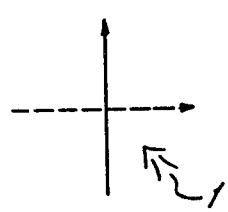
FIGS. 1a and 1b show the optimum viewing directions for good contrast and high visibility in relation to the orientations of the liquid crystal molecules at the light-entering and light-leaving faces of the liquid crystal layer.
Figure 1B:
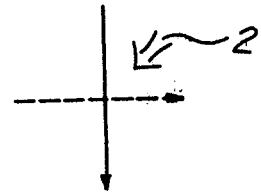

The relevance of the rotational directions of the helical configuration can be seen from FIGS. 1a and 1b in which the solid arrow indicates the orientation direction of the interior face of the base plate nearer the viewer and the dashed arrow indicates the orientation of the interior face of the base plate further from the viewer. For convenience, in the description which follows, the nearer plate will be referred to as the upper plate and the further plate will be referred to as the lower plate, this terminology carrying over into the description of the poly-layer constructions as well.

In a display cell in which the inner surfaces of the upper and lower base plates are oriented as indicated diagrammatically by the solid and dashed arrows respectively, in FIG. 1a, the resultant quarter-turn helix of liquid crystal molecules is oriented for rotating the plane of polarized light passing therethrough in the clockwise direction. Where the orientations of the plate surfaces are as shown in FIG. 1b, the quarterturn helix produced will rotate the plane of polarized light passing therethrough in the counterclockwise direction. For a liquid crystal display cell having the configuration shown in FIG. 1a, maximum contrast and visibility result when the display is viewed from the direction indicated by the arrow designated with the reference numeral 1. For the cell of FIG. 1b the optimum viewing direction is that indicated by the arrow carrying the reference numeral 2. According to said U.S. Pat. No. 3,941,454, the preferred viewing direction makes an angle of about 45° with the rubbing direction on the upper plate and an angle of about 135° with the rubbing direction on the lower plate.

Since an increase in the number of liquid crystal layers and in the number of base plates necessary for confining such layers must lead to an increase in the absorption of light in the device, it is critical that the orientation directions in successive base plates and liquid crystal layers be such as to minimize such loss of light. This minimization is effected by aligning the orientation directions in the base plates and in the resultant helices formed by said plates so that the optimum viewing directions for all of the layers in a poly-layer device coincide.

In general, orientation directions will differ by about 90° for the two base plate surfaces forming an individual cell containing an individual liquid crystal layer. However, it is recognized that the actual angle between the orientation directions may differ somewhat from 90° (or from 180° with respect to differences between cells) without seriously degrading the quality of the display. A poly-layer display device within the scope of the present invention is shown in FIG. 2 in which the number of liquid crystal layers in 2, the layers being indicated schematically by the arrows having the reference numerals 3 and 4. Liquid crystal layers 3 and 4 are held between transparent base plates 5.1, 5.2 and 5.3. The array of base plates is sandwiched between polarizer plates 31 and 32, the polarization axis of polarizer 31 being indicated by the double-headed solid arrow 6 and the polarization direction of polarizer plate 32 being indicated by the double-headed dashed arrow 7. The orientation direction of the lower surface of upper base plate 5.1 is indicated by the dashed arrow 8 and the orientation direction of the upper surface of intermediate base plate 5.2 is indicated by the solid arrow 9. These orientation directions differ by about 90° and in the embodiment shown in FIG. 2 the helix of liquid crystal molecules formed will rotate the plane of polarization in the counterclockwise direction.

The orientation direction of the bottom surface of intermediate base plate 5.2 is indicated by the dashed arrow 10, said direction being anti-parallel to that of the upper surface of intermediate base plate 5.2. The upper portion of the liquid crystal molecules in liquid crystal layer 3 also has the orientation corresponding to arrow 10 while the lower portion of liquid crystal layer 3 has the orientation corresponding to the solid arrow 11, this latter orientation being produced by the orientation direction of the upper surface of end base plate 5.3. The helix of liquid crystal molecules produced by the orientation directions indicated by the arrows 10 and 11 result in clockwise rotation of the plane of polarization of plane-polarized light passing through liquid crystal layer 3.

Comparison of the individual cells, that is, the individual liquid crystal layers in FIG. 2 with the configurations of FIGS. 1a and 1b shows that rotation of FIG. 1b through 90° in a counterclockwise direction would bring the configuration thereof into correspondence with the upper layer of the array of FIG. 2. Consequently, the optimum viewing direction would be that corresponding to the upper, left-hand quadrant. Now considering liquid crystal layer 3, rotation of FIG. 1a through 180° in either clockwise or counterclockwise direction would bring this figure into correspondence with the configuration of liquid crystal layer 3, and, again, the optimum viewing direction would be in the second quadrant, that is, the upper, left-hand quadrant. As is evident, then, assembling the array of surface-oriented base plates so that the helix rotational directions are alternately clockwise and counterclockwise and so that the surface orientations of each intermediate base plate are anti-parallel brings the optimum viewing direction into coincidence for all of the cells in an array.

A three-layer array within the scope of the present invention is shown in FIG. 3, the array consisting of end base plates 15.1 and 15.4 with intermediate base plates 15.2 and 15.3 between said end base plates. The base plates hold liquid crystal layers therebetween, successive liquid crystal layers being indicated by the reference numerals 12, 13 and 14. The base plates 15.1 through 15.4 are sandwiched between polarizer plates 33 and 34.

The surfaces of transparent plates 15.1 and 15.2 in contact with liquid crystal layer 14 in the embodiment shown in FIG. 3 are oriented to produce a helix having a counterclockwise rotational sense. Similarly, the surfaces of intermediate plates 15.2 and 15.3 produce a clockwise rotation in liquid crystal layer 13 and the orientations of the surfaces of plates 15.3 and 15.4 in contact with liquid crystal layer 12 produce a counterclockwise helical rotation.

It will be noted that in passing from one liquid crystal layer to the next layer, the direction or sense of rotation is reversed. Also, the orientations of the two surfaces of each intermediate plate are anti-parallel. Further, an analysis such as carried out with respect to FIG. 2 demonstrates that the optimum viewing directions for all of the cells coincide so that there is no loss in contrast or visibility as the result of failure to make such viewing directions coincide.

It will be noted that the polarization axes 6 and 7 of upper and lower polarizing plates 31 and 32 in FIG. 2 are parallel whereas the corresponding axes 16 and 17 of upper and lower polarizations 33 and 34 in FIG. 3 are at 90° to each other. In general, the polarization axes of a pair of polarization devices will be parallel when the number of layers is even and will be crossed when the number of layers in the poly-layer array is odd. Also, for optimum visibility and contrast it is preferred that the polarization axis of the upper polarization device be at 90° to the orientation direction of the upper end base plate. Taking into account the requirements of a quarter-turn helix of reversed rotational sense in each successive liquid crystal layer, the polarization axis of the lower polarization device will automatically also be at 90° to the orientation direction of the upper surface of the lower base plate. That this requirement is met can be seen from FIGS. 2 and 3.

The configurations which prevail in the various layers as shown in FIGS. 2 and 3 correspond to the condition in which there is no electric field across any of the cells. Such an electric field is, of course, applied by the use of transparent electrodes (not shown) on the surfaces of the various base plates. Moreover, as stated in the aforenoted U.S. Pat. No. 3,941,454, the voltage applied to a cell to produce a display must be less than the saturation voltage, say about 6 volts when the saturation voltage is 15 volts.

Figure 4:
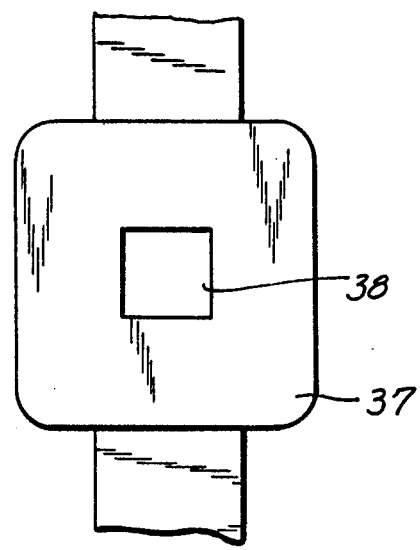
FIG. 4 is a timepiece including a display cell in accordance with the present invention.

In FIG. 4, a timepiece 37 includes a poly-layer display cell 38 as described above.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A liquid crystal display device, comprising an array of at least three plates, two of said plates being end plates and the remaining plates being intermediate plates, said plates taken in pairs forming cells one less in number than the number of said plates, a layer of nematic liquid crystal material of positive dielectric anisotropy in said cells, opposed surfaces of the pairs of plates having electrode means thereon for forming characters a vector from the bottom to the top of any of said characters defining a reference direction, a polarizing device at the exterior face of each end plate in said array, successive liquid crystal layers being considered alternately even and odd, the two plate faces in contact with each of said liquid crystal layers having surface orientation directions for forming the liquid crystal molecules in said layer into a helix with a twist of about 90°, said twist being in one rotational direction for the even layers and in the opposite direction for the odd layers, the two faces of each intermediate plate in said array being surface-oriented in approximately anti-parallel directions, that is, at approximately 180° to each other, one of said end plates being that through which said device is to be viewed and being termed upper end plate and each of said cells thereby being formed of an upper and lower plate, said surface orientation directions being regarded as vectors, the angle from said reference direction to said surface orientation direction on each of said upper plates being approximately 45° and to said surface orientation direction on each of said lower plates being approximately 135°, said electrodes being connectable to an exterior voltage source.

2. A liquid crystal display device as claimed in claim 1, wherein the polarization axis of each of said polarizing devices is at an angle of about 90° with respect to the orientation directions of the corresponding end plate.

3. A liquid crystal display device as claimed in claim 1, wherein said polarization axes of said polarizing devices are approximately parallel to each other for arrays of an even number of liquid crystal layers and approximately at 90° to each other for arrays of an odd number of liquid crystal layers.

4. A liquid crystal display device as claimed in claim 1, wherein said liquid crystal display device is a component in a timepiece.

* * * * *